(12) United States Patent
Press

(10) Patent No.: US 8,172,180 B2
(45) Date of Patent: May 8, 2012

(54) TEMPERATURE MONITORING

(75) Inventor: Andrew Julian Press, Bristol (GB)

(73) Assignee: Bae Systems PLC, London (GB)

( * ) Notice: Subject to any disclaimer, the term of this patent is extended or adjusted under 35 U.S.C. 154(b) by 583 days.

(21) Appl. No.: 12/304,318

(22) PCT Filed: Nov. 28, 2008

(86) PCT No.: PCT/GB2008/051133
§ 371 (c)(1),
(2), (4) Date: Dec. 11, 2008

(87) PCT Pub. No.: WO2009/068918
PCT Pub. Date: Jun. 4, 2009

(65) Prior Publication Data
US 2010/0155539 A1    Jun. 24, 2010

(30) Foreign Application Priority Data

Nov. 30, 2007 (EP) .................................. 07270068
Nov. 30, 2007 (GB) .................................. 0723440

(51) Int. Cl.
*B64D 15/20* (2006.01)
(52) U.S. Cl. ........................ 244/134 F; 385/12; 340/580
(58) Field of Classification Search .............. 244/117 R, 244/133, 214, 134; 385/12–14; 340/580
See application file for complete search history.

(56) References Cited

U.S. PATENT DOCUMENTS

| | | | |
|---|---|---|---|
| 4,036,457 A * | 7/1977 | Volkner et al. | 244/134 D |
| 4,599,255 A * | 7/1986 | Anglin et al. | 244/117 R |
| 4,942,078 A * | 7/1990 | Newman et al. | 244/134 C |
| 5,029,977 A | 7/1991 | Wheeler | |
| 5,698,848 A | 12/1997 | Belk | |
| 5,709,470 A * | 1/1998 | Finley | 340/580 |
| 5,921,502 A | 7/1999 | Al-Khalil | |
| 6,024,488 A * | 2/2000 | Wu et al. | 385/12 |
| 6,196,500 B1 | 3/2001 | Al-Khalil et al. | |
| 6,310,999 B1 * | 10/2001 | Marcuse et al. | 385/16 |
| 7,249,735 B2 * | 7/2007 | Amorosi et al. | 244/214 |

(Continued)

FOREIGN PATENT DOCUMENTS

EP    680 878    11/1995

(Continued)

OTHER PUBLICATIONS

International Preliminary Report on Patentability and Written Opinion in related application No. PCT/GB2008/051133 mailed Jun. 2, 2010.

(Continued)

*Primary Examiner* — Galen Barefoot
(74) *Attorney, Agent, or Firm* — Pillsbury Winthrop Shaw Pittman LLP

(57) ABSTRACT

A temperature monitoring arrangement for an electro-thermal ice protection system is provided for a slat of an aircraft wing, incorporating heater mats of composite material, wherein, in order to avoid or at least substantially reduce some of the problems associated with use of discrete temperature sensing elements, one or more optical fiber temperature sensors are embedded within the heater mats for sensing an overheating condition of each mat. Advantageously, a control system is used to monitor the temperature of the mats, and adjusts power supplied, or switches off power, in response to detection of an overheating condition.

26 Claims, 4 Drawing Sheets

U.S. PATENT DOCUMENTS

| | | | |
|---|---|---|---|
| 7,389,011 B2 * | 6/2008 | Ogura et al. | 385/12 |
| 7,523,889 B2 * | 4/2009 | Bourjac et al. | 244/134 D |
| 2002/0125414 A1 | 9/2002 | Dammann | |
| 2005/0184193 A1 | 8/2005 | Bourjac | |
| 2006/0146909 A1 * | 7/2006 | Morse et al. | 374/130 |

FOREIGN PATENT DOCUMENTS

| | | |
|---|---|---|
| GB | 2 323 441 A | 9/1998 |
| GB | 2 407 377 A | 4/2005 |
| JP | 2003-57125 | 2/2003 |

OTHER PUBLICATIONS

European Search Report issued in EP 07 27 0068.5, Jul. 1, 2008, 3 pages.

UK Intellectual Property Office Search Report issued in GB0723440.4, Jan. 31, 2008, 3 pages.

Notification of Transmittal of International Search Report, Search Report, and Written Opinion of the International Searching Authority issued in PCT/GB2008/051133, Feb. 5, 2009, 12 pages.

* cited by examiner

TEMPERATURE MONITORING

CROSS REFERENCE TO RELATED APPLICATIONS

This is the U.S. National Phase of PCT/GB2008/051133, filed Nov. 28, 2008, which claims priority to British Application No. 0723440.4, filed Nov. 30, 2007, and European Application No. 07270068.5, filed Nov. 30, 2007, the entire contents of all of which are incorporated herein by reference.

FIELD OF THE INVENTION

The present invention concerns improvements relating to temperature monitoring for detecting overheating conditions in electro-thermal ice protection systems for aircraft.

BACKGROUND OF THE INVENTION

Large commercial transport aircraft have traditionally utilised hot-air ice protection systems. The hot-air is supplied via bleed from the engines. Commonly hot-air systems do not employ temperature monitoring equipment. Electro-thermal heater systems previously have been widely used to provide ice protection to areas such as engine inlets and helicopter rotors. It has been proposed to use electrically powered heater mats integrated into the wing structure to provide electro-thermal ice protection in the Boeing 787 Airliner. Temperature monitoring of such heater mats is necessary.

Wing structures have been traditionally of metallic construction but there is an increasing trend towards the use of composite materials. Electro-thermal heater mats are either bonded onto a metallic structure or are built directly into a composite structure. Composite structures typically comprise many individual layers of differing materials and properties. It is vital to monitor the temperature of structures incorporating electro-thermal ice protection systems to ensure overheat does not occur leading to potential structural failure, particularly in composite structures. In current systems, this is performed by embedding discrete sensors (e.g. thermo-couples, etc.) into the composite structure during manufacture or bonding them onto the surface of the structure.

Integration of discrete sensors into composite structures may cause many problems during the manufacturing process. Ensuring they are located at the correct location throughout the lay-up and cure process is problematic. Their physical size can compromise the structural integrity and their lack of robustness is such that there are often significant numbers of inoperable sensors after the cure process. The electrical connection to the sensors can be problematic with the added issue of electro-magnetic compatibility and interference. Additionally, during test and development (either full-scale or wind-tunnel) many more temperature sensing points are required to validate the design, which compound these problems. Given the problems associated with integrating each discrete sensor, known systems generally only monitor the structural temperature at what is perceived to be the single most critical location. However other locations, where temperature-related problems may occur, may be significant.

OBJECTS AND SUMMARY OF THE INVENTION

It is an object of the present invention to overcome or at least substantially reduce some of the above mentioned drawbacks.

The present invention provides in a first aspect a method of monitoring temperature for an electro-thermal ice protection apparatus of an aircraft, which apparatus includes a plurality of heater elements, each formed as a mat, and mounted in an aircraft part, the method comprising providing at least one optical fibre temperature sensor mounted within said part and sensing the respective temperature of each said mat, and determining an overheating condition of a said mat in the event of such overheating.

In a second aspect, the invention provides an electro-thermal ice protection apparatus for an aircraft, comprising a plurality of heater elements, each formed as a mat, mounted in an aircraft part, and including at least one optical fibre temperature sensor mounted within said part and positioned in or adjacent said mats for sensing the respective temperature of each said mat, for determining an overheating condition of a said mat.

The ice protection apparatus may advantageously be installed in any appropriate part of an aircraft, but a preferred location is the aircraft wing, especially the leading edge, which is vulnerable to icing problems. It will be appreciated that the invention has particular application to a slat positioned along the leading edge.

The use of fibre-optics and their immunity to electro-magnetic interference effects and lightning strike provide considerable advantage over traditional metallic connections for standard discrete temperature sensors. Additionally, many temperature measurements can be made at multiple locations using a single optical fibre with a single connection. This drastically reduces the weight, complexity and component count when compared with the equivalent electrical measurement methods which comprise multiple thermocouples, each requiring individual cables and connections.

Where a plurality of heater mats are positioned adjacent one another, a continuous optical fibre strand may extend through and between each mat. In some circumstances, it may be desirable to connect together with appropriate connector elements shorter lengths of fibre to provide a single continuous fibre length. The continuous fibre sensor can then be used to determine temperature at arbitrary locations along its length and within the heater mats, thereby giving temperature distribution information across the heater mats. This temperature information is used to monitor potential overheat problems within the aircraft part or structure. This distributed sensing capability not only provides potential safety improvements (by monitoring a greater extent of the heater system than possible using discrete sensor technology) but also may assist in optimising heater mat power distributions.

Typically, using known discrete sensor technology, structural temperatures are monitored at only one heater mat location (this mat having been estimated as being the most critical) due to the expense and complication of installing many sensor devices. Using the fibre-optic sensing approach in accordance with embodiments of the invention enables the temperatures of all of the mats to be monitored. Overheat problems in any of the mats may then be detected and appropriate action taken. For example, power could be reduced only to mats in an overheating condition, whereas, with a single discrete sensor, power to the entire set of heater mats would typically have to be reduced since it would have to be assumed that the whole array may be suffering a problem.

The fibre-optic sensor arrangement in accordance with a preferred embodiment of the invention passes heater mat temperature information back to an ice protection system (IPS) control unit via a direct connection within the system wiring loom or through a sensor system data bus. The IPS control unit is able to control the electrical power distribution to the individual heater mats. The temperature information from the heaters enables the IPS control unit to monitor for overheat problems and react by managing the power distribution to the individual mats. The ability of the ice protection apparatus/system in accordance with embodiments of the invention to monitor efficiently all of the heater mat temperatures is likely to enhance the safety of the platforms in which it is installed as compared to known single sensor systems, and allow a measured response to any identified problems. The IPS control unit additionally has the potential, with the more extensive heater mat temperature monitoring of the invention, to adjust the power being distributed to each mat to obtain optimal performance in terms of minimum power consumption for achieving a given level of protection.

In accordance with embodiments of the invention, added safety benefits of monitoring the structure at many locations may be realised, together with the possibility of using temperature information to optimise the heater power distribution. Conveniently, the invention may be readily employed in test and development (either full-scale or wind-tunnel), where many more temperature sensing points are required to validate the design.

It is to be understood that the precise form of optical fibre sensor may take a variety of forms. In a preferred embodiment of the invention, Bragg gratings are formed at intervals along the length of the fibre, so that reflection from each grating at a particular wavelength gives an indication of temperature at the grating. Alternatively, continuous sensing may be employed along the entire length of the sensor, monitoring light scattered from within the fibre.

Optionally, a fibre-optic (FO) based sensor is incorporated in a heater mat formed of composite material. The FO sensor is embedded into the pre-form composite material, comprising either one of the layers of a composite structure incorporating electro-thermal heater mats prior to the curing process or into the composite based heater mat bonded to a metallic based structure. The ability to incorporate the fibre optic sensor into a composite lay-up greatly simplifies the manufacturing process, as compared to using discrete sensors, with the consistency of location being ensured and minimal compromise to the structural integrity. Further, because the robustness of optical fibres through the curing process has been effectively demonstrated with fibres being able to withstand the mechanical, chemical and thermal environments which can entail typical pressures and temperatures of 80 psi and 200° C. for autoclave cured carbon composites, the problem of sensors going inoperable during the manufacturing process is minimised.

There is no standardised approach to fibre embedding in composite structures, with individual suppliers evolving their own proprietary approaches based on manufacturing trials for specific applications. In general, optical fibres are packaged in some way so that they may be easily handled by non-specialist fabricators. The packaging typically consists of a protective sleeve over the length of fibre. The sleeve must be compatible with the material into which it is to be embedded and ideally is made from the same structural fibre as the composite (e.g. glass/carbon fibre braid sleeving). Some suppliers will provide optical fibres ready incorporated into dry or resin pre-impregnated 'Tows' of fibre. The packaged fibres are then laid into the composite as it is laid up ply-by-ply.

Connection to the fibre-optic (FO) sensors can be performed at a convenient location using embedded FO connector technology, if required (see I. Read's paper on "Development and testing of connectors for optical fibres embedded into high strength composite materials": International workshop on structural health monitoring, Stanford, September 2005). Optical fibres can be packaged with their connectors so that the whole assembly may be placed as one into the composite during lay-up. The end result is a composite item with an embedded optical fibre complete with semi-embedded connector. Other methods for dealing with the connection to the embedded fibre use trailing leads where the embedded fibre exits the composite material through the surface or at a suitable edge.

The above and further features of the invention are set forth in the appended claims and will be explained in the following by reference to a preferred embodiment which is illustrated in the accompanying drawings in which:

DETAILED DESCRIPTION OF PREFERRED EMBODIMENT

Figure 1:
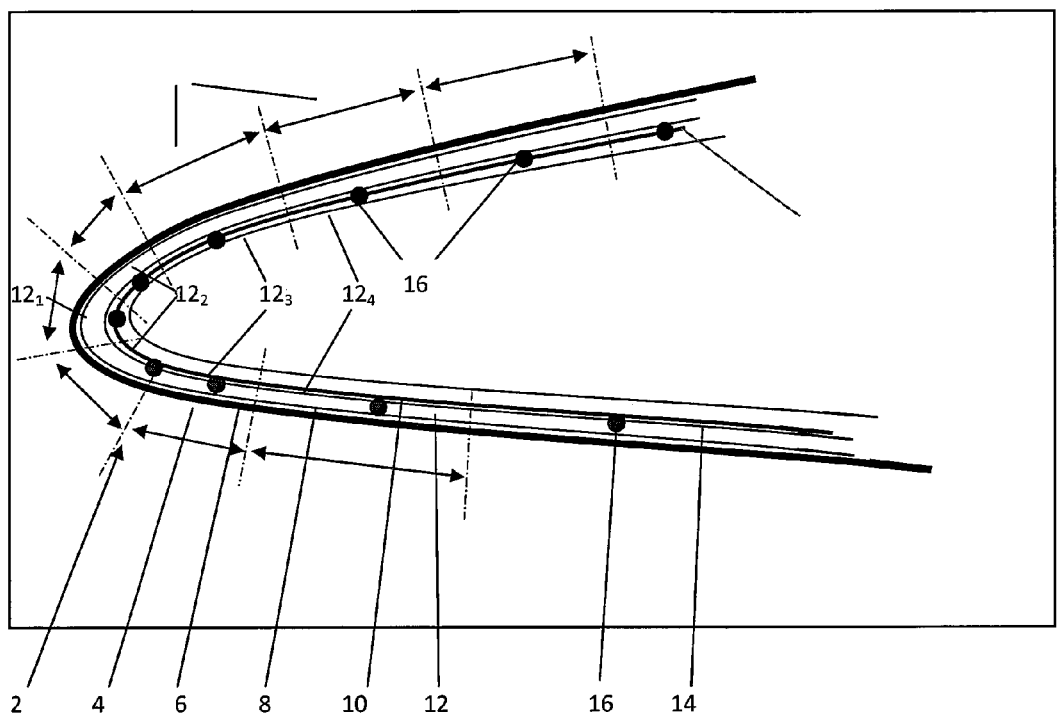
FIG. 1 shows a cross-section of the leading edge of a slat of an aircraft wing incorporating an embodiment of the invention.

Referring first to FIG. 1, a leading edge slat 2 of an aircraft wing is defined by a contoured surface, which in this example is formed as an outer metallic erosion shield 4, inner layers 6, 10 of dielectric and structural composite material and a layer 8 of heater mats. The heater mats each extend a defined extent chord-wise, in a direction perpendicular to the length or span of the slat. Heater mats $12_1$, $12_2$, adjacent the leading edge, define what is known as a parting strip, where de-icing control is critical, and are smaller in width than heater mats $12_3$, $12_4$, etc., spaced from the leading edge. The width of each heater mat will be determined, inter alia, by the extent that de-icing considerations vary across the chord, and this will readily be determined by the person skilled in the art.

Figure 2:
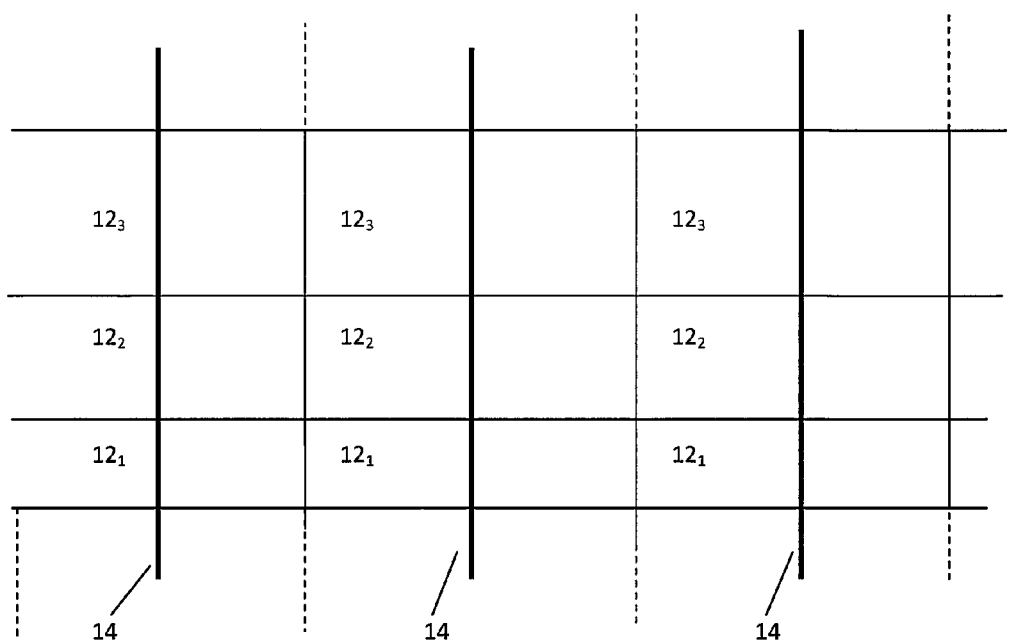
FIG. 2 is a diagrammatic plan view of series of heater mats positioned along the span of the slat of FIG. 1.

As shown diagrammatically in FIG. 2, a series of heater mats $12_1$, $12_2$, $12_3$ etc., extend along the span or length of the slat, each mat having a predetermined length—as will be appreciated by the person skilled in the art, this length can be determined by practical considerations in forming heater mats in the slat. The heater mats form part of an electro-thermal ice protection apparatus/system, and each mat is coupled to electric power leads (see FIG. 4) for providing controlled amounts of electric power density to each mat, as determined by a control system. Each heater mat comprises a pad of composite material in which heater elements may be embedded (as described above), and this pad may form part of a structural composite layer of the slat, or, in a modification, may be bonded to a metallic layer, such as erosion shield 4.

As shown in FIG. 2, a series of temperature sensing optical fibres 14 are provided along the length of the wing, each fibre-optic (FO) sensor extending in a transverse (chord-wise) direction, and one sensor being allocated for each set of mats having the same location along the span of the wing. A sensor or series of sensors in single or multiple fibres is typically incorporated into a composite pre-preg lay-up prior to resin injection and cure. Alternative configurations are also possible where the fibre-optic temperature sensors are applied as surface bonded features after the manufacture of the structure. The ends of the optical fibres are connected to suitable connector pieces at remote locations which are non-critical for temperature sensing or structural integrity.

The temperature of the mats as sensed by the optical fibres 14 is fed back to the control system to monitor and control potential overheating problems. As mentioned above, each fibre may sense the temperature continuously along the length of the fibre, or at specific locations along the length of the fibre by means of Bragg gratings. Commonly, sensing at a single central location for each mat will be sufficient, as indicated at 16. However, for initial testing purposes, it may be desirable to sample temperature at a large number of locations. Further fibres or further Bragg gratings may be incorporated to permit such testing.

Figure 3:
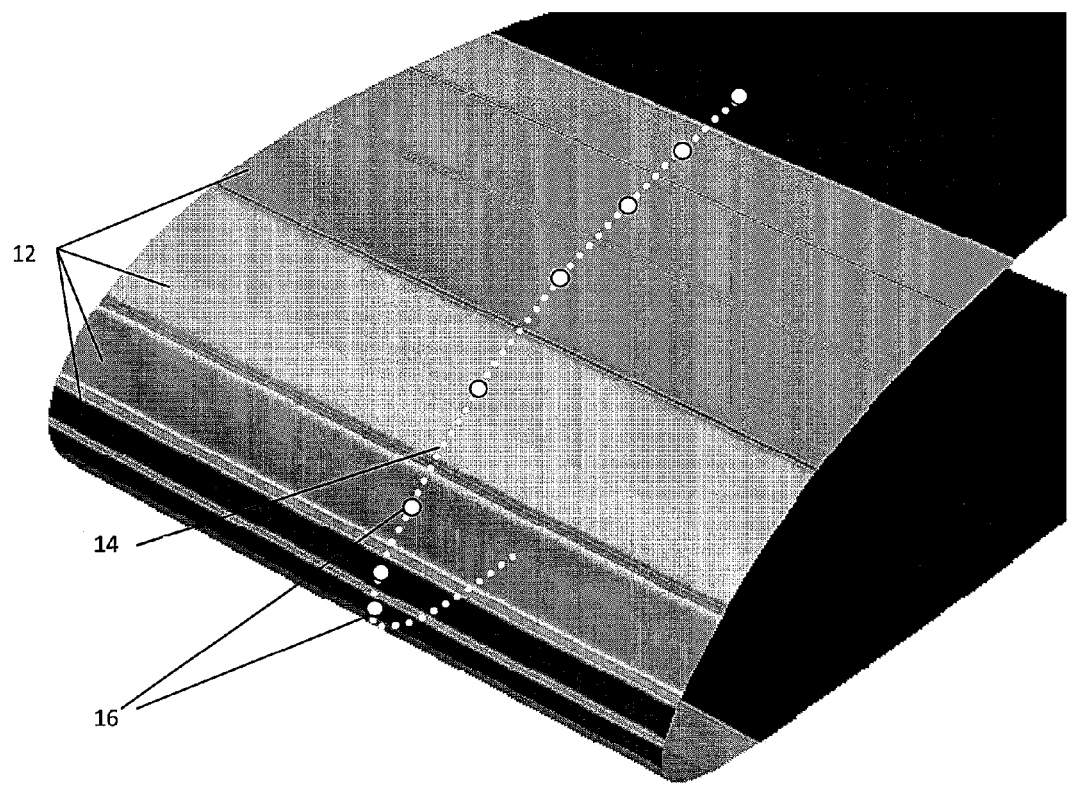
FIG. 3 is a diagrammatic perspective view of the embodiment of FIG. 1 illustrating a typical location for a fibre-optic temperature sensor and showing typical heater mat temperatures.

FIG. 3 illustrates a typical location for the fibre-optic (FO) sensor and the typical locations at which the temperature could be monitored around the slat chord across each of the individual heater zones. Typical heater mat locations around the chord of a slat are shaded to illustrate a typical temperature distribution. The location of an embedded fibre-optic to sense temperature across the heater mat region is illustrated.

Figure 4:
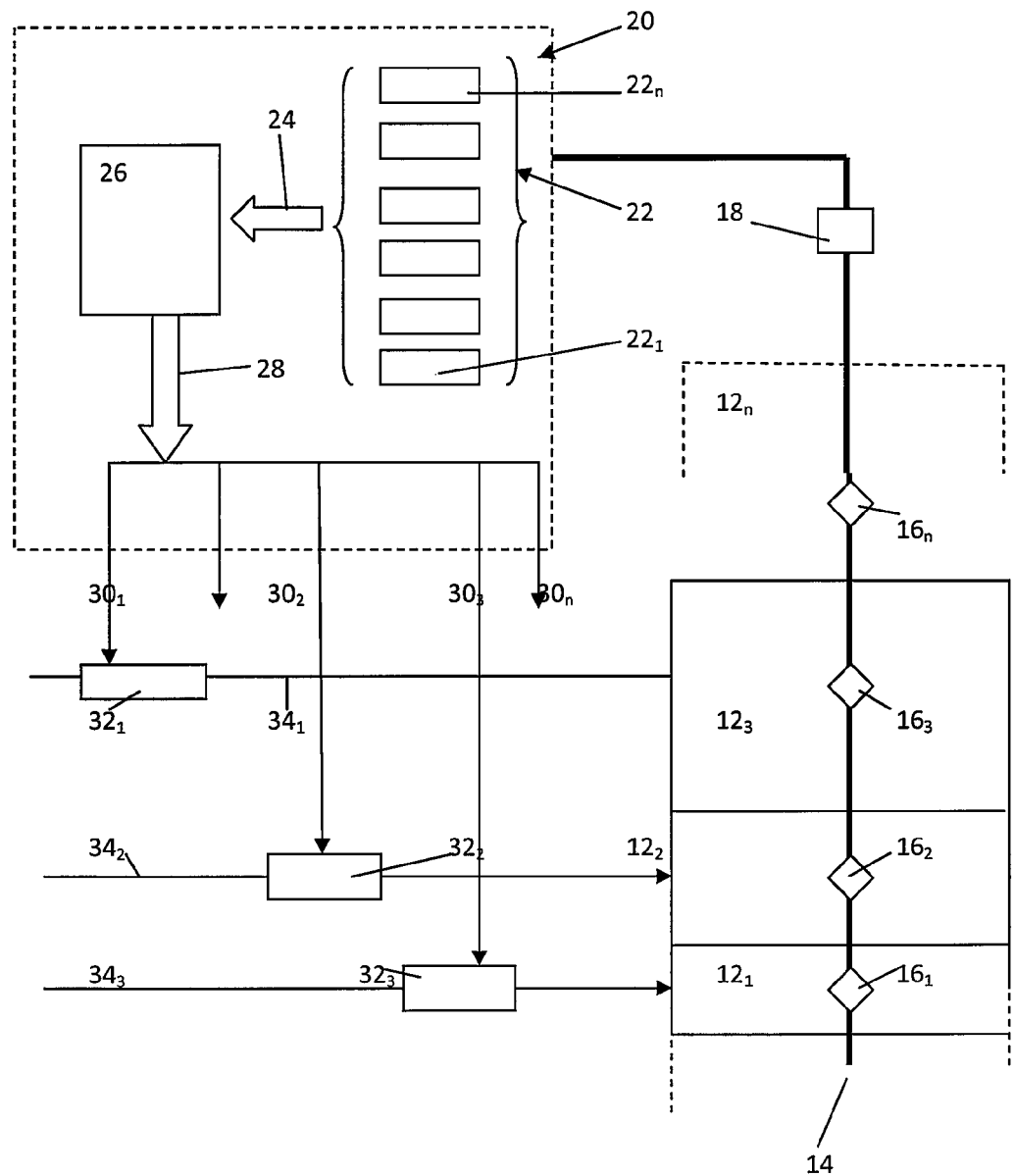
FIG. 4 is a block diagram of a control system incorporating the embodiment of FIG. 1.

Referring to FIG. 4, there is shown a block diagram of an electro-thermal ice protection apparatus/system which incorporates the embodiment of FIG. 1. A single optical fibre 14 is shown having Bragg Gratings $16_1$-$16_n$, positioned at the midpoints of respective heater mats $12_1$-$12_n$. The optical fibre 14 is coupled via a connector 18 to IPS control unit 20, where optical pulse signals passing along the fibre are demodulated, so that the light frequency which is scattered by each Bragg grating is determined. The precise value of the scattered light frequency for each Bragg grating provides an accurate measure at the temperature of the respective heater mat. As shown schematically at 22, a voltage signal representing the frequency value of each Bragg grating pulse is determined as at $22_1$-$22_n$, and provided on bus 24 to a processor 26. Processor 26 determines whether each frequency signal is higher than a respective threshold value. This indicates an overheating condition of the respective heater mat, and appropriate output control signals are provided on a bus 28, thence to control lines $30_1$-$30_n$. Each control line controls a respective switch/gain unit $32_1$-$32_n$ in a respective power line $34_1$-$34_n$ for each heater mat $16_1$-$16_n$.

As indicated above, detection of an overheating condition may cause the IPS control unit to selectively switch off power to the appropriate heater mat, and to nearby mats as required, or to reduce the power supplied. The system is completely flexible and any appropriate response may be made to the determination of an overheating condition. In a common configuration, as shown in FIGS. 1 and 3, heater mats $12_1$, $12_2$ are energised with an appropriate amount of power to ensure that ice cannot form on the mats; heater mats $12_1$, $12_2$ form what is known as a parting strip. Ice which may form over heater mats $12_3$ etc is then either lifted off by aerodynamic forces, and/or appropriate amounts of power are supplied to the mats to ensure that ice cannot bond to the slat surface.

Fibre-optic (FO) sensing enables temperatures at all heater mats to be monitored. In the case of the detection of a single mat overheat event, power can be reduced to that particular mat. Depending on the location of the problematic mat, power to other mats can be adjusted to attempt to negate any impact on the level of ice protection. For example, upstream mats could assume an evaporative mode, or de-icing cycles could be modified to ensure ice is built up only on forward mats from which it can be subsequently shed. This mode of operation would be sub-optimal in terms of consumed power but would ensure continued levels of ice protection.

The control system shown in FIG. 4 is illustrative, and other implementations may be employed. For example, an alternative implementation in accordance with another embodiment of the invention is that the fibre-optic (FO) signals are decoded on the aircraft wing and data is passed to the IPS control unit by an electronic wing sensor data bus via a Remote Interlace Unit (RIU).

It is to be understood that any feature described in relation to any one embodiment may be used alone, or in combination with other features described, and may also be used in combination with one or more features of any other of the embodiments or, any combination of any other of the embodiments. Further, equivalents and modifications not described above may also be employed without departing from the scope of the invention, which is defined in the accompanying claims.

The invention claimed is:

1. A method of monitoring temperature for an electro-thermal ice protection apparatus of an aircraft, which apparatus includes a plurality of heater elements, each formed as a mat, and mounted in an aircraft part, the method comprising using at least one optical fibre temperature sensor mounted within said part to sense the temperature of each said mat, and determining an overheating condition of a said mat in the event of such overheating, wherein the mat is formed of a composite material.

2. A method as claimed in claim 1, including selectively adjusting and/or switching the power supplied to the heater elements upon detection of an overheating condition.

3. A method as claimed in claim 1, wherein said one optical fiber temperature sensor is either arranged to sense temperature in a continuous region along its length, or at predetermined locations along its length.

4. A method as claimed in claim 1, wherein said aircraft part comprises a slat for the leading edge of an aircraft wing.

5. A method as claimed in claim 1, wherein the optical fibre temperature sensor comprises a plurality of optical fibre temperature sensors, each mat being allocated to a sensor of the plurality of sensors.

6. A method as claimed in claim 5, wherein each optical fibre temperature sensor is at a mid-point of the respective mat.

7. A method as claimed in claim 5, wherein the optical fibre temperature sensor has a Bragg grating and the temperature of each respective heater mat is detected in accordance with a frequency of light scattered by the Bragg grating.

8. A method as claimed in claim 1, wherein the optical fibre temperature sensor is embedded within the composite material mat.

9. A method as claimed in claim 8, wherein composite material mat includes a carbon fibre composite material.

10. An electro-thermal ice protection apparatus for an aircraft, comprising a plurality of heater elements, each formed as a mat, mounted in an aircraft part, including at least one optical fibre temperature sensor mounted within said part and positioned in or adjacent said mats for sensing the temperature of each said mat, for determining an overheating condition of a said mat, wherein the mat is formed of a composite material.

11. An apparatus as claimed in claim 10, including means for determining the temperature of each mat in relation to a threshold value, for providing an overheating signal.

12. An apparatus as claimed in claim 10, including means for selectively adjusting and/or switching power supplied to each mat in dependence upon detection of an overheating condition of one mat.

13. An apparatus as claimed in claim 10, wherein said part comprises a slat for the leading edge of an aircraft wing.

14. An apparatus as claimed in claim 13, wherein said slat includes a leading edge part formed of a sandwich construction including an outer metallic shield and an inner layer of composite material.

15. An apparatus as claimed in claim 10, wherein said part is formed of composite material, and said mats are incorporated into said composite material.

16. An apparatus as claimed in claim 10, wherein said part includes a metallic layer, and said mats are bonded to said metallic layer.

17. An apparatus as claimed in claim 13, wherein said mats are positioned contiguously across the leading edge of the slat, with mats adjacent the leading edge being of a relatively small dimension, and mats further away from the leading edge being of a larger dimension.

18. An apparatus as claimed in claim 13, wherein a series of heater mats are provided extending along the length of the slat.

19. An apparatus as claimed in claim 13, wherein said at least one optical fiber temperature sensor extends transversely in a chord-wise direction across said slat.

20. An apparatus as claimed in claim 19, wherein a series of optical fiber temperature sensors are provided, each extending transversely of the slat.

21. An apparatus as claimed in claim 10, wherein said at least one optical fiber temperature sensor is arranged such as to sense temperature continuously along its length.

22. An apparatus as claimed in claim 10, wherein the optical fibre temperature sensor comprises a plurality of optical fibre temperature sensors and each mat is arranged to be allocated to a sensor of the plurality of sensors.

23. An apparatus as claimed in claim 22, wherein each optical fibre temperature sensor is at a mid-point of the respective mat.

24. An apparatus as claimed in claim 22, wherein the optical fibre temperature sensor has a Bragg grating and the temperature of each respective heater mat is detected in accordance with a frequency of light scattered by the Bragg grating.

25. An apparatus as claimed in claim 10, wherein the optical fibre temperature sensor is embedded within the composite material mat.

26. An apparatus as claimed in claim 25, wherein composite material mat includes a carbon fibre composite material.

* * * * *